United States Patent [19]

Gregg

[11] 4,340,822
[45] Jul. 20, 1982

[54] WIND POWER GENERATING SYSTEM

[76] Inventor: Hendrick J. Gregg, 625 S. Alton Way, Denver, Colo. 80231

[21] Appl. No.: 178,868

[22] Filed: Aug. 18, 1980

[51] Int. Cl.³ .............................................. F03D 1/02
[52] U.S. Cl. ...................................... 290/55; 290/44; 416/142; 416/244 A
[58] Field of Search ................. 416/142 B, 41, 46, 47, 416/120, 121, 123, 182, 192, 196 A, 244 A; 415/60-62; 290/44, 55

[56] References Cited

U.S. PATENT DOCUMENTS

| 644,102 | 2/1900 | Sedgewick | 416/121 A |
|---|---|---|---|
| 2,679,298 | 5/1954 | Wykes | 416/47 |
| 2,832,895 | 4/1958 | Hütter | 416/41 A |
| 4,110,631 | 8/1978 | Salter | 290/55 |
| 4,162,410 | 7/1979 | Amick | 290/55 |

FOREIGN PATENT DOCUMENTS

| 973968 | 2/1951 | France | 415/60 |
|---|---|---|---|
| 59852 | 8/1954 | France | 416/121 A |

Primary Examiner—Stanley J. Witkowski
Assistant Examiner—Shelley Wade
Attorney, Agent, or Firm—Richard L. Johnston

[57] ABSTRACT

A wind power generating system is provided to generate power for the farm or ranch, state or county service buildings, and light industrial uses. The concept utilizes wind energy efficiently to convert power and can be rendered inoperative to avoid destruction by excessive wind flows.

2 Claims, 7 Drawing Figures

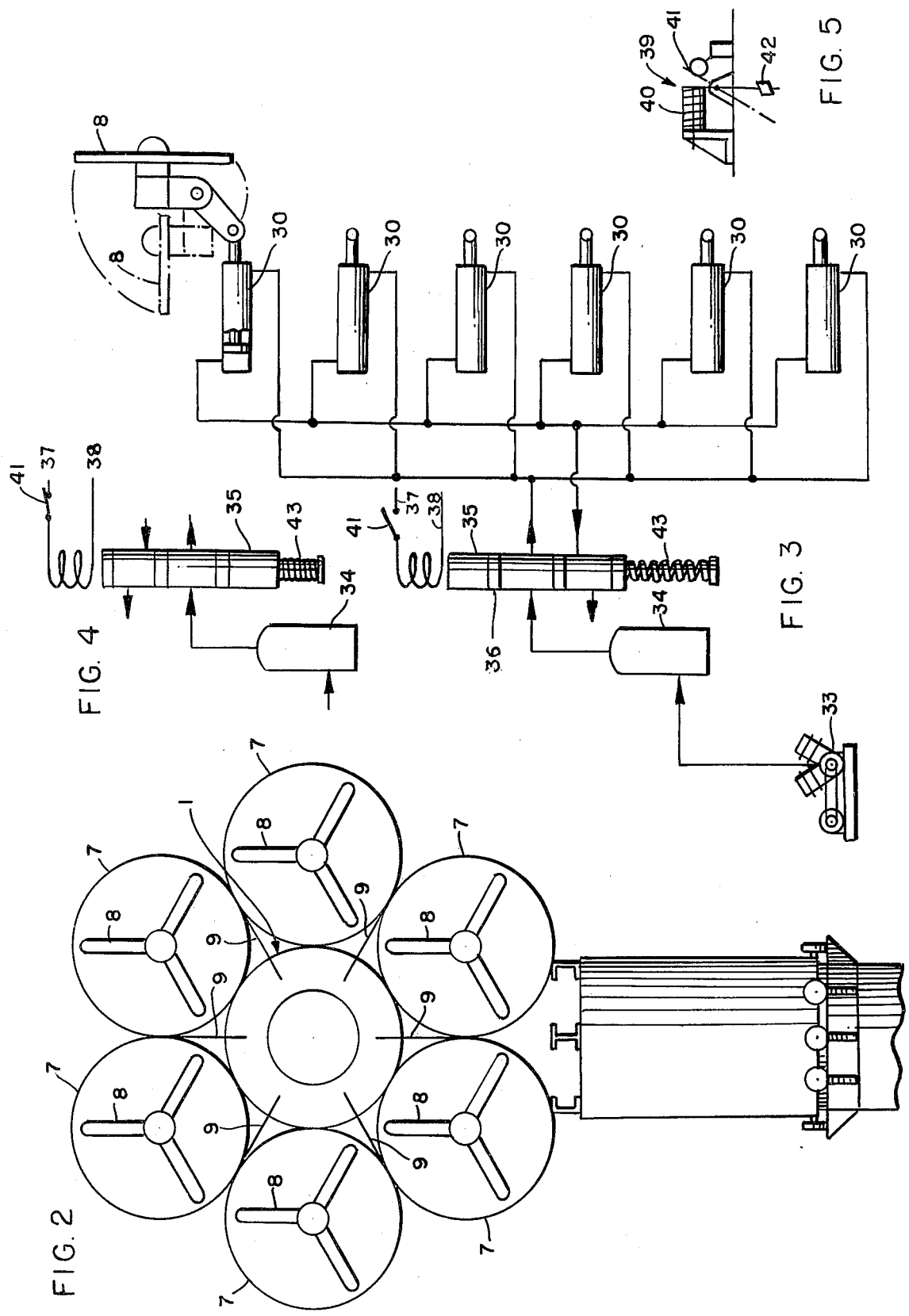

WIND POWER GENERATING SYSTEM

BACKGROUND

Various attempts have been made to utilize wind as a motive force for generating power. Most of the devices that have been proposed are so-called "windmills" in which a propeller is driven by the wind and the shaft on which the propeller is mounted is drivingly connected either to a pump or to an electric generator. Such windmills have been widely used in the United States and foreign countries.

In some cases these windmills involve the use of huge rotors where attempts have been made to generate electric power on a relatively large scale. These devices have encountered certain problems with noise, vibration, and structural fatigue.

It is therefore desirable to provide a new and improved wind power generating system which is more efficient and which can be rendered inoperative to avoid destruction by excessive winds.

BRIEF SUMMARY OF THE INVENTION

With the foregoing desiderata in mind, the present invention provides a wind power generating system which is compact and capable of farm/ranch use of industrial use, which can be constructed to utilize wind energy efficiently in order to provide a power generating system, and can be rendered inoperative to avoid destruction by excessive wind.

DETAILED DESCRIPTION OF THE INVENTION

In accordance with the invention a wind power generating system is provided comprising a shaped, closed, hollow central member having a generally circular cross section which is cylindrical in an intermediate part of said member, tapers forwardly to a snub nose at the front and tapers rearwardly to a back area, a plurality of open cylindrical shrouds mounted around the outside and supported at least in part by the outer surface of said central member, a propeller mounted centrally on a shaft in each of said shrouds, each said propeller or rotor adapted to be driven by wind passing over the nose and forward part of said central member, and means responsive to the rotation of said propellers operative to generate power.

In addition to the general structure previously outlined, a feature of this invention is the provision of fins which are mounted on the outer surface of the central member and extend outwardly therefrom and tangentially between adjacent shrouds that channel wind flow to each propeller.

Another feature of the invention is that the propellers are rotatably mounted for movement from a normal operating position in a vertical plane to an inoperative position where they are not affected by high winds.

A further feature of the invention is to provide an independent fluid pressure system for controlling the movement of the propellers from an operating position in a vertical plane to an inoperative position.

Another feature of the invention is to provide means for controlling movement of the propellers from an operating position in a vertical plane to an inoperative position in a different plane in response to means mounted in the forward portion of the central member and actuated by high winds.

An additional feature of the invention is the provision of wind directional fins or vanes mounted on the back area of said central member with the entire assembly mounted on a support for swivel rotation in a horizontal plane whereby no auxiliary independent mechanism is required to place the entire unit in a position where it receives the maximum available wind.

Still another feature of the invention is to provide a wind power generating system for generating electricity in which there are no brushes to arc or otherwise contend with.

The invention will be further illustrated but is not limited by the following description in conjunction with the accompanying drawings wherein:

FIG. 2 is a front view, with parts broken away, of the embodiment shown in FIG. 1;

FIG. 3 is a diagramatic view illustrating a system utilizing independent or stored fluid pressure for moving the propellers from an operative to an inoperative position to avoid destruction by high winds;

FIG. 4 is a diagramatic representation of an individual system for rendering propellers inoperative;

FIG. 5 illustrates a mechanism for controlling the movement of the propellers from a normal operating position to an inoperative position which is actuated by high winds;

Figure 7:
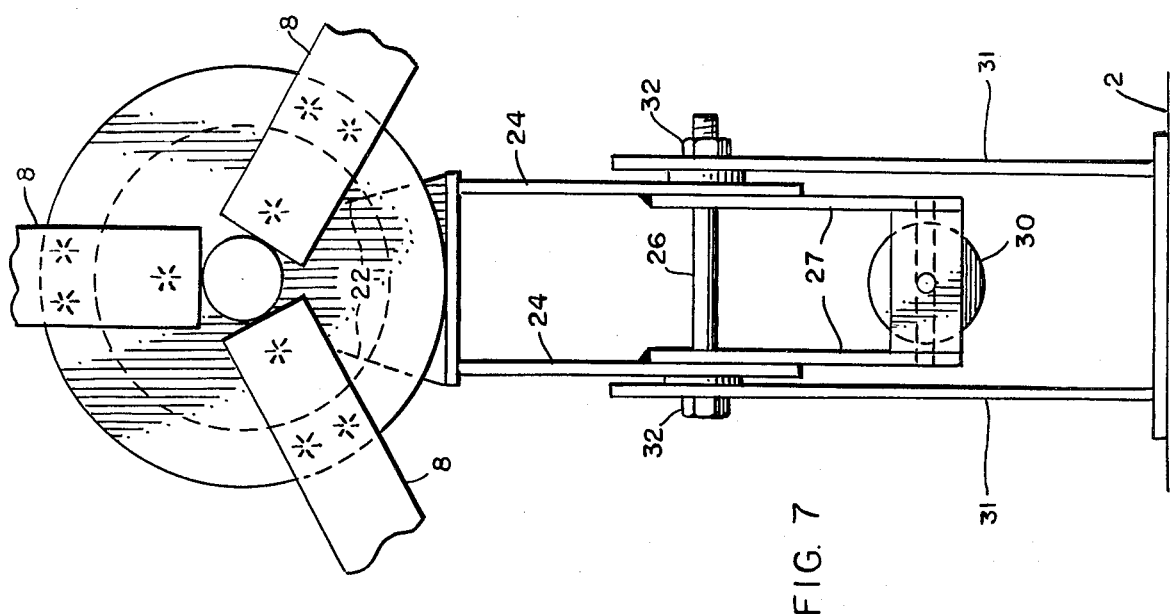
Figure 6:
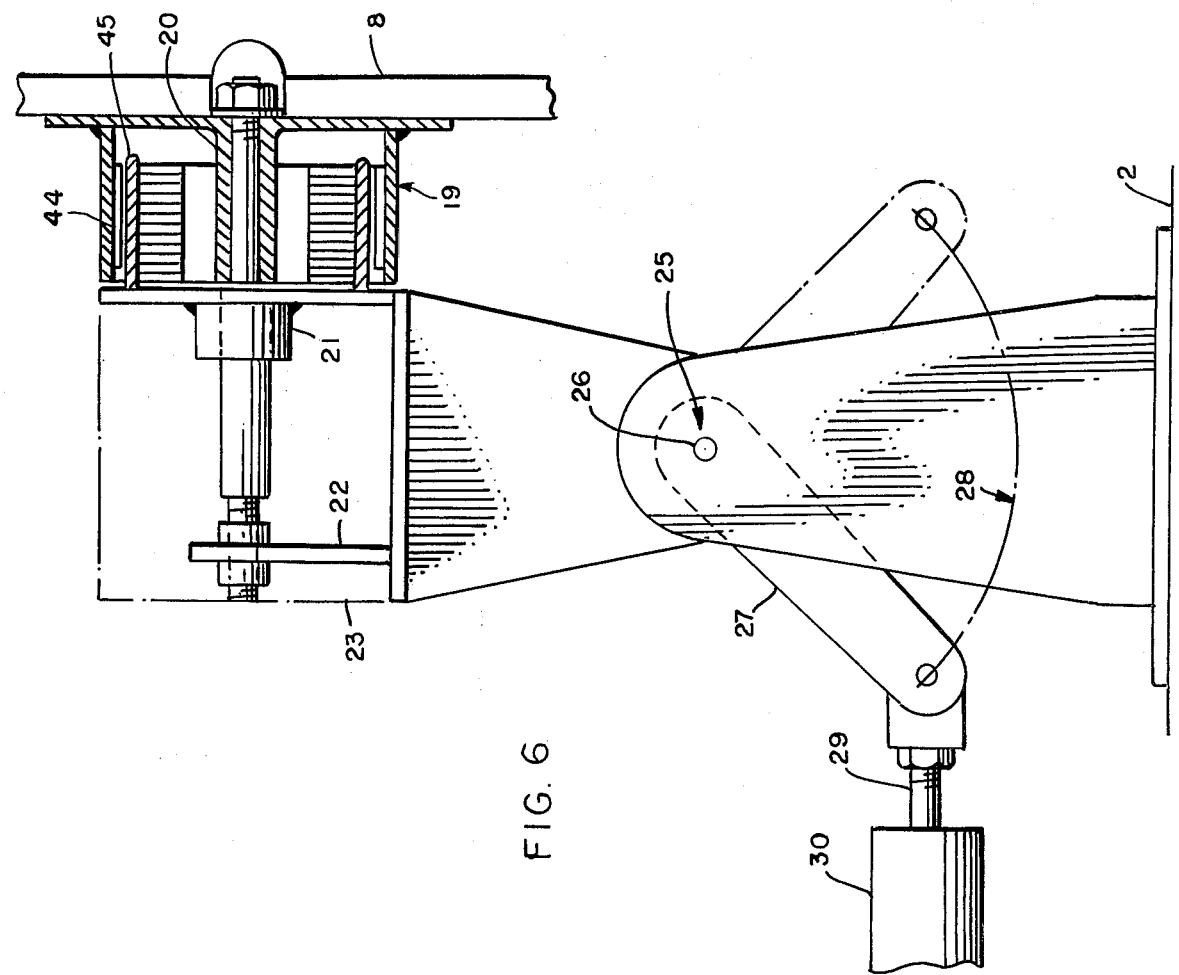

FIG. 6 is an enlarged elevational view, partly in section and with parts broken away, showing a preferred type of system for generating electric power in response to the rotation of the propellers wherein each propeller has a rearwardly extending housing affixed thereto with a permanent magnetic field fixed to said housing and capable of rotating over a fixed armature; and FIG. 7 is a side elevational view of FIG. 6.

Figure 1:
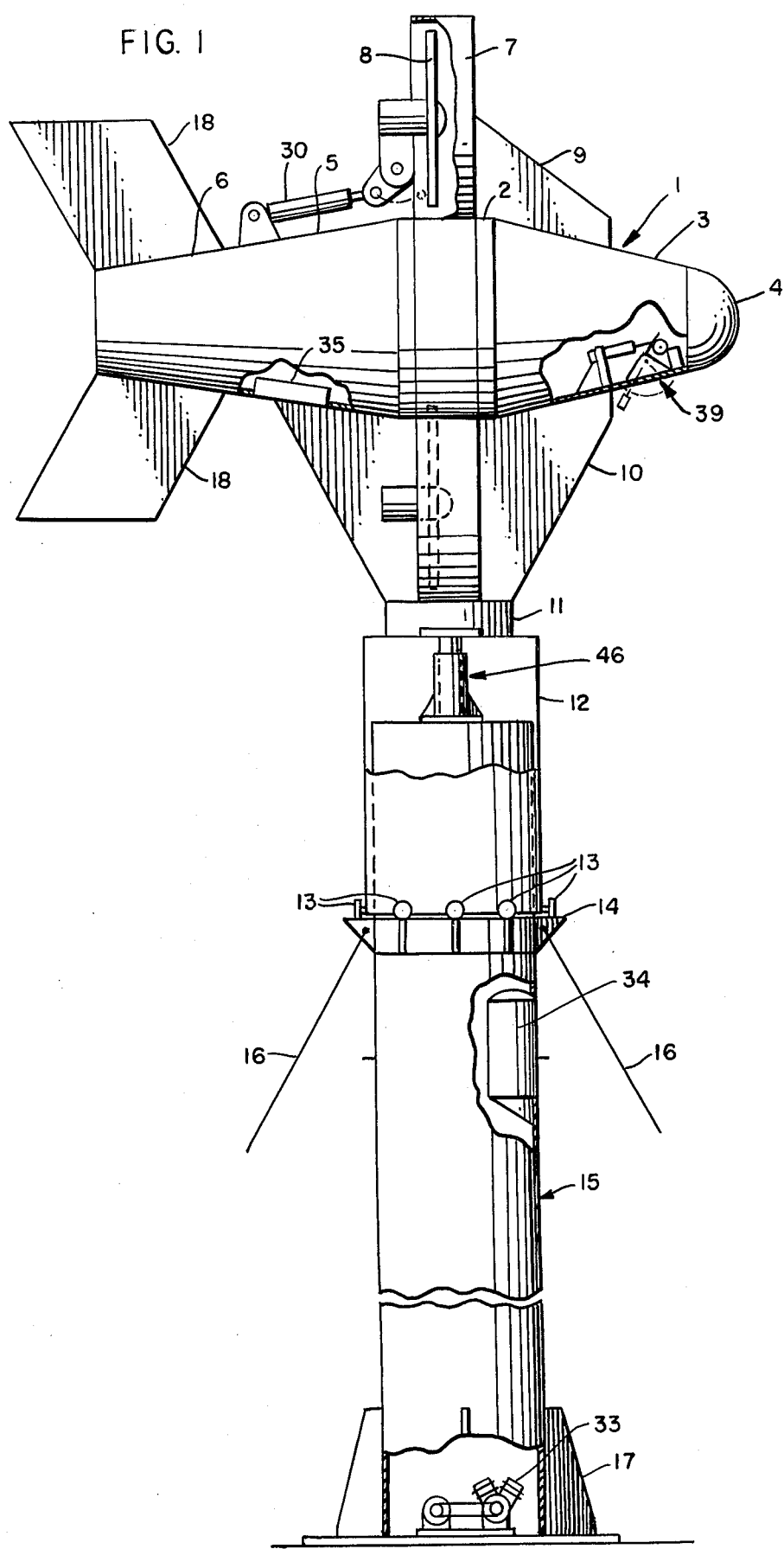
FIG. 1 is a side elevational view, with parts broken away, of one embodiment of the invention.

Referring to FIG. 1, the closed, hollow central member 1 has a generally circular cross section which is cylindrical in the intermediate part 2 of said member, tapers forwardly 3 to a snub nose 4 at the front and tapers rearwardly at 5 to a back area 6. As shown, the shape of this central member is generally cigar shaped or bomb shaped. A plurality (in this case six) of open cylindrical shrouds 7 are mounted around the cylindrical intermediate portion 2 of central member 1 and a propeller 8 is mounted within each of said shrouds. In the embodiment shown the propellers have three blades but it will be understood that they can have two or more blades which are adapted to be driven by the wind.

Radial gusset fins 9 that channel wind flow to each propeller are mounted on the outer surface of the forward and central portion 3 and the intermediate portion 2 of the central member 1 and extending outwardly therefrom and tangentially between adjacent shrouds 7 (see FIG. 2).

Central member 1 is connected by mounting means such as metal plates 10 to a base member 11 which in turn is mounted on bell 12. Bell 12 is provided with supporting rollers 13 which permit the bell and the entire superstructure to swivel or rotate on ring platform 14 of tower 15. Guy wires 16 and a base structure 17 are provided to insure the rigidity of tower 15. Guide fins 18 on back area 6 align the rotatable superstructure in response to the direction of the wind.

As previously indicated, an important feature of the invention is to provide means for moving the propellers from an operating position in a vertical plane to an inoperative position in a different plane so as to avoid destruction of the unit in high winds. As shown in FIGS. 6 and 7, each of the propeller blades 8 are affixed to a housing generally shown at 19 which rotates freely on a fixed spindle 20 supported by member 21 and member 22. Members 21 and 22 are both welded, or otherwise secured to member 23 which has a normally downwardly depending portion 24 with a hole therein at 25 adapted to receive a shaft 26 on which crank arms 27 are mounted for pivot rotation from left to right and vice versa in an arc indicated at 28. Pivot member 27 is pivotally connected to a piston rod 29 actuated in response to fluid pressure in tilt cylinder 30. The tilting mechanism is supported by supporting means 31 mounted on cylindrical surface 2 of central member 1. Shaft 26 is secured in place by nuts 32,32 which are threaded on opposite ends of the shaft. The upper arms 24 of the tilting mechanism are affixed to the crank arms 27 so that the movement of the crank arms 27 in response to actuation of the piston 29 by fluid pressure in cylinder 30 causes the entire propeller unit to tilt from a normally vertical position to a position in which the propeller is not substantially affected by high velocity winds or tornadic conditions.

Air pressure is provided by means of an electrically operated air compressor 33 positioned at the base of the tower as shown in FIG. 1 which supplies compressed air to a central receiving tank 34. A 4-way valve 35 is disposed in the hollow portion of central member 2 and is provided with a solenoid operated spool piston 36 which is electrically connected through wires 37 and 38 to any suitable source of electrical energy such as a battery or an electrical generator, not shown, and to a trigger mechanism generally indicated at 39. The trigger mechanism 39 as shown in FIG. 5 comprises an adjustable tension spring 40 adapted to trip a normally open limit switch 41 which moves in response to the force of the wind against flag 42. When limit switch 41 is closed as shown in FIG. 4 due to high winds, the 4-way valve 35 which has a spring return 43 is actuated permitting air to flow from receiver 34 into each of the piston cylinders 30, thereby simultaneously tilting each of the propellers 8 from a vertical position as shown in full lines in FIG. 5 to a position as shown in dotted lines in FIG. 3. In lieu of air pressure, it will be recognized that other means such as mechanical means may be employed to operate the tilt mechanisms.

In order to generate electrical power the best mode contemplated is that illustrated in FIG. 6 wherein the housing 19 affixed to propeller blades 8 are in turn fixed to a permament magnet field 44 which rotates around fixed armature windings 45, thereby generating an electric current output which may be taken off either as AC or DC current depending upon the type of power it is desired to have the wind plate generate. This current may also be used to actuate the electrical circuit controlling the 4-way valve 35 through limit switch 41. Likewise, the power generated can be used to drive air compressor 33. If DC power is generated, it can be transmitted to a storage battery or otherwise utilized. DC electrical energy can be converted to AC electrical energy through a Gemini Synchronous Inverter connected to a utility power grid. During wind calm, power is supplied by the utility. Excess power generated from the wind is returned to the utility grid for credit. Other means may be used to drive the air compressor. The wind power generated can also be integrated with power generated by other means.

Air hoses and electric power cables are laced through the hollow king pin structure generally indicated at 46 which also serves to hold the tower and bell assembly and the top assembly or superstructure in alignment.

The permanent magnet generators are over 90% efficient and because the field rotates and the armature remains fixed there are no brushes to arc or contend with. For a four kilowatt unit in a 22 mile an hour wind, the outside diameter of the rotating housing need only be about 15 inches. This is quite suitable for a power plant of 40–50 Kw with 12 foot diameter shrouds and propellers bolted to the rotating field housing.

By using a diameter on the cylindrical portion 2 of central member 1 equal to each of the shroud diameters a rather efficient structural design is provided. This is further strengthened by the six radial gusset fins 9 that channel wind flow to each propeller. Wind boundary layers are amplified and velocity increased as the available feed wind velocity meets the main nose cone 4 and flows over the forward portion 3 of central member 1 to the propellers 8 turning in their respective shrouds 7. This concept generates about twice the power from six 12 foot propellers as compared to a single open rotor of 36 foot diameter at the same wind feed velocity.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A wind power generating system comprising a shaped, closed, hollow central member having a generally circular cross section which is cylindrical in an intermediate part of said member, tapers forwardly and inwardly to a nose at the front and tapers rearwardly and inwardly to a back area, a plurality of open cylindrical shrouds fixedly mounted around the outside of said central member and supported at least in part by the outer surface of said central member, fins mounted forwardly on the outer surface of said central member and extending outwardly therefrom and tangentially against adjacent shrouds to channel wind flow to said shrouds, a propeller mounted centrally on a shaft in each of said shrouds, each said propeller adapted to be driven by wind passing over the nose and forward of said central member, and means responsive to the rotation of said propellers operative to generate electrical power.

2. A wind power generating system comprising a shaped, closed, hollow central member having a generally circular cross section which is cylindrical in an intermediate part of said member, tapers forwardly and inwardly to a nose at the front and tapers rearwardly and inwardly to a back area, a plurality of open cylindrical shrouds fixedly mounted around the outside of said central member and supported at least in part by the outer surface of said central member, a propeller mounted centrally on a shaft in each of said shrouds, each said propeller adapted to be driven by wind passing over the nose and forward of said central member, said propellers being rotatably mounted for movement from a normal operating position in a vertical plane to a position where they are not affected by high winds, said movement being effected in response to independent fluid pressure stored in a receiver tank, said fluid pressure being controlled by a valve disposed in said central member and actuated electrically from a switch operated in response to wind pressure and disposed in the forward portion of said central member, and means responsive to the rotation of said propellers operative to generate electrical power.

* * * * *